(12) United States Patent
Rippingale

(10) Patent No.: US 8,489,920 B2
(45) Date of Patent: Jul. 16, 2013

(54) METHOD AND APPARATUS INTEGRATING NAVIGATION AND SAVING THE WRITABLE STATE OF APPLICATIONS

(75) Inventor: Jan Rippingale, Cobb, CA (US)

(73) Assignee: i-Cue Design, Inc., Ukiah, CA (US)

(*) Notice: Subject to any disclaimer, the term of this patent is extended or adjusted under 35 U.S.C. 154(b) by 1796 days.

(21) Appl. No.: 11/316,439

(22) Filed: Dec. 20, 2005

(65) Prior Publication Data

US 2006/0111988 A1    May 25, 2006

Related U.S. Application Data

(63) Continuation-in-part of application No. 10/607,617, filed on Jun. 27, 2003, now Pat. No. 7,346,555.

(60) Provisional application No. 60/638,035, filed on Dec. 20, 2004.

(51) Int. Cl.
G06F 11/00 (2006.01)
G06F 9/45 (2006.01)

(52) U.S. Cl.
USPC ............... 714/15; 714/2; 714/38.1; 717/151; 717/153

(58) Field of Classification Search
None
See application file for complete search history.

(56) References Cited

U.S. PATENT DOCUMENTS 6,131,192 A * 10/2000 Henry .......................... 717/175
6,247,042 B1 * 6/2001 Engstrom et al. ............. 718/107
6,681,384 B1 * 1/2004 Bates et al. ................... 717/129
2008/0104252 A1    5/2008 Henniger

OTHER PUBLICATIONS

Web snapshot of the history and features of Firefox, a web browser.

* cited by examiner

Primary Examiner — Lewis A Bullock, Jr.
Assistant Examiner — Mark Gooray
(74) Attorney, Agent, or Firm — Earle Jennings

(57) ABSTRACT

The invention includes a computerized method responding to a navigation cue from a user by saving the writable state of the application and directing the computer through the window operating system to perform the navigation task 36 indicated by the navigation cue. The invention includes the following, which will each be discussed in turn. An alteration mechanism including means for altering window operating system by altering the hook triggered by each navigation cue to integrate saving the writable state. The window operating system integrating response to each navigation cue and saving the writable state. Source code artifacts which can be installed to implement navigation cues triggering saving the writable state. A business method generating revenue for a business entity.

17 Claims, 3 Drawing Sheets

METHOD AND APPARATUS INTEGRATING NAVIGATION AND SAVING THE WRITABLE STATE OF APPLICATIONS

CROSS REFERENCES TO RELATED PATENT APPLICATIONS

This application claims priority to Provisional Application 60/638,035, filed Dec. 20, 2004, and is a continuation-in-part of application Ser. No. 10/607,617, filed Jun. 27, 2003 now U.S. Pat. No. 7,346,555, both of which are incorporated herein by reference.

TECHNICAL FIELD

This invention relates to operating systems, methods and apparatus altering operating systems, in particular, the components of a window operating system and its user interface stimulated by navigation cues and storing the writable state of the applications.

BACKGROUND OF THE INVENTION

Much of computer science relates to data management. Software programs support various methods of allowing the user to input, process and save data. The array of software applications that manage data in this way includes programs designed for individual users, multiple users of intranets, the internet, the worldwide web, and e-commerce. Examples of such software applications in these contexts include word processing, spread sheets, web page design, contact management, graphics, financial transactions, program development systems, e-commerce shopping carts, and so on.

Social psychology studies show people tend to favor the shortest route to accomplishing a goal. Because of this, the software and computer industry tend to enhance ease and speed of programs and data management. By way of example, website usability professionals such as the Nielsen Norman Group have found that increasing usability on an e-commerce website by 10% can increase sales by 10% to 400% depending on a combination of usability factors on the overall design, including usability of the shopping cart.

A good example of how time saving steps are eagerly adopted by the computing and software marketplace is the history of printing a document on a computer-driven printer. In the early days of computers, the user had to input a series of nearly 20 commands in the correct order before the printer was activated. Now, users take it for granted that all they need do is click "print" and the sequence (now hidden but still in place) will produce a printed version of their document.

Currently, the rule of data entry is that a task cue must be combined with a navigation command before the user may leave a page with new data on it and have that new data recorded. In effect, this is a "rule" of computer science, which is to see the navigation command as only the navigation command, and not to identify that there may be a separate and distinct command that may be broken out of it to save the user time and/or the server bandwidth. As used herein, a client process will primarily involve the user interface and a server process will primarily involve data processing and/or data management. The client process and the server process may reside in the same computer, or distinct computers.

What is needed are techniques which enhance the experience of users of computers and computer-based services, so that data entry and management in individual user applications, intranets, the internet and worldwide web are quicker, easier, more energy efficient, and more natural. What is also needed is a way to reduce server load.

As used herein, a computer includes at least one data processor and at least one instruction processor, where each data processor is directed by at least one instruction processor. Computers including more than one instruction processor may include two instruction processors executing the same instruction format, or alternatively, two instruction processors executing different instruction formats.

As used herein, an operating system controls at least one computer to execute at least one application. Often the operating system initializes one or more of the instruction processors and one or more of the data processors to start the application. Often the operating system provides an interface to a memory device such as a disk drive by maintaining a file management system for accessing the data stored on the disk drive. An example of an operating system includes the early versions of BASIC found on 8 bit microprocessor systems such as the ALTAIR 8800.

As used herein, a real-time operating system is an operating system for managing the execution of more than one application executing and using the computer during a single period of time. This is achieved using a data structure known as a task list. The task list includes at least one, and usually many, task entries.

An application is executed by a real-time operating system by creating at least one task entry. Each task entry includes an instruction pointer into accessibly coupled instruction memory as to where the task will next execute an instruction, a data configuration to be loaded by the data processor doing data processing for the application, and a instruction configuration to be loaded into the instruction processor to direct the data processing.

Some computers have only one data processor and one instruction processor, and the instruction pointer, the data and instruction configurations may be merged into internal state configuration. Often, the task entry is designated by a pointer to a memory location, where the internal state configuration is stored.

Examples of a real-time operating system include command line versions of UNIX, as invented and developed at Bell Labs in the twentieth century, and the OS operating system of the IBM 360 and 370 computers.

A window operating system is a real-time operating system supporting a user interface including the possibility of multiple windows and at least one interactive user input device. A window will refer to an at least two dimension display domain which the user can perceive through a display device being controlled by the computer. Each window is associated with at least one application, which begins or continues execution when the window is opened.

An interactive user input device may include a keyboard, a mouse, a joystick, a touchpad, a voice recognition interface, and/or a gesture recognition interface. The mouse and/or joystick may portray motion across a two or more dimensional movement domain, possibly sensing not only position, but also speed, acceleration, and/or some form of pressure.

A navigation cue refers to a recognized command from the user received through at least one of the interactive user input devices directing the computer through the window operating system, to navigate the one or more perceived windows to either open a new window, close an existing window, bring a window into perception by the user, or minimize a window in terms of the user's perception. These various activities can be recognized and altered by the use of hooks, which are defined interface locations within the accessible memory. They are specific to each window operating system, and in some cases, to each implementation of the window operating system.

By way of example, most window operating systems support navigation cues through mouse operations which open and close windows, and trigger applications to open new windows.

Another example, some window operating systems support navigation cues through a task bar, often including task buttons, which trigger the opening of applications such as a web browser or word processor.

Another example, some applications support multiple views running with the same application and traversed within the same window by navigation cues, for instance, multiple tabs to different web sites by a web browser, and multiple views of the same or different documents by a word processor.

A further example, some window operating systems support navigation cues based upon keyboard operations, such as keystroke combinations or sequences that successively bring to the front each open window of the window operating system.

Consider how applications and the computers running applications fail or crash. An application's execution is disrupted when the application enters an indeterminate or illegal state. Often these situations lead to the application doing unpredictable and/or damaging behavior, such as corrupting the contents of files, sometimes damaging the integrity of the file system being managed by the operating system. In the early days of operating systems, often the computer would literally stop or spew reams of gibberish. Often then, and to this day, computers must be reset, possibly by turning off and on, to restart the operating system, in order to regain control.

Real-time operating systems inherit this weakness from operating systems and add a new problem to the mix. It is now possible to demand more resources be used at the same time than exist. Example, execution of two or more applications, each fitting in the available memory, but collectively requiring more than what is available, causes the real-time operating system a new problem.

Often, the real-time operating system possesses tools to at least partially mitigate the situation, such as a virtual memory sub-system using part of one or more disk drives as a temporary store to augment the accessible memory. These tools work in a pinch, but tend to be fragile, and overloaded real-time operating systems tend to crash, often due to memory conflicts, in which one application writes on the memory of another.

Window operating systems inherit the weaknesses of both real-time operating systems and operating systems, in general. They add yet another weakness, the tendency for a window to not always release allocated resources successfully. Over time, many window operating system environments become clogged with the resource allocations, which were not successfully released when their use was over.

A comment should be made here, the software community is well aware of these weaknesses, and has instituted various error handling procedures to try and limit the unpredictability of application crashes. The hardware community is also aware of these weaknesses, and has invented various memory manager circuits to minimize memory conflict problems. With all due regard to these noble efforts, the fact remains that computers and the applications running on them crash, and people all over the world continue to lose data, money and time to such failures. Methods and mechanisms are needed to mitigate these losses due to these crashes.

SUMMARY OF THE INVENTION

The invention includes each of the following. An alteration mechanism including a means for altering a window operating system by altering the hook triggered by navigation cues to integrate saving the writable state of applications. Window operating systems integrating response to navigation cues and saving the writable state. And source code artifacts, implemented as products of manufacture, which can be installed on a computer to implement navigation cues triggering saving the writable state. A business method including sales or subscriptions for implementations of the previous embodiments of the invention generating revenue for a business entity.

The invention minimizes the damage and loss from computer and application crashes, as well as the frustration caused by inadvertent loss of data. The window operating systems that benefit from the invention include those sold by Microsoft, Apple, and Red Hat. All personal computers and workstations benefit from implementations of their window operating system where navigation cues trigger saving the writeable state of the applications running on those systems as well as the navigation task to be done.

The writable state of an application is preferably written to a non-volatile memory encapsulating enough of the state of the application that at least one view open at the time of writing may be reconstructed.

While there have been numerous examples of task cues which also triggered navigation, the inventor knows of no window operating system where triggering a navigation cue saves the writable state of an application.

The means for altering the window operating system may include intercepting triggers for navigation cues and insertion into the task list the actions needed to save the writable state of the application prior to the navigation cue being executed.

Alternatively, the means for altering may include intercepting triggers for navigation cues and insertion into the task list of the actions needed to save the writable state of the application while the navigation cue is being executed.

Another alternative, the means for altering may include execution code replacing the navigation cue execution code, with a new execution code that saves the writable state and perform the commanded navigation.

The means for altering may reside on a removable memory device, which can be accessibly coupled to the computer to alter the window operating system.

Alternatively, the means for altering may reside in a download package, which the computer may receive through a download operation, and execute to alter the window operating system, either with or without the user's direct knowledge or approval.

The resulting window operating system integrates response to navigation triggers with saving the writable state of applications. Window operating systems in the future may be distributed with this feature, and companies and/or individuals may generate revenue based in part on the inclusion of the invention in the window operating system being distributed, either as a standalone computer product, a distribution memory device, or as a download.

The invention also includes source code artifacts, implemented as products of manufacture, which can be installed on a computer to implement navigation cues which triggers saving the writable state. These artifacts can be accessed to alter and/or build a window operating system, for that or another computer. The artifacts may be included on a removable memory device, or be included in a download package. Installation may include decompressing at least part of the artifact, building a directory structure populated at in least part by the decompressed contents of the artifact, and the results of compilation, assembling, and/or linking operations using the contents of the artifact.

The invention includes a business method including sales or subscriptions for implementations of the previous embodiments of the invention which generate revenue for a business entity. An example of the implementation may include a download package sold for a price by the business entity to create the revenue. Another example, a computer with an implementation of a window operating system where triggering navigation cues is integrated with saving the writable state of the application, sold or leased by the business entity to create the revenue. Another example, a distribution device incorporating the means for altering and/or installing the invention's window operating system and/or the source code artifacts sold by the business entity to create the revenue. Any of the sales may be part of a subscription creating the revenue for the business entity. The implementation and the revenue are products of the business process.

DETAILED DESCRIPTION

This invention relates to operating systems, methods and apparatus altering operating systems, in particular, the components of a window operating system and its user interface stimulated by navigation cues and storing the writable state of the applications.

Figure 1:
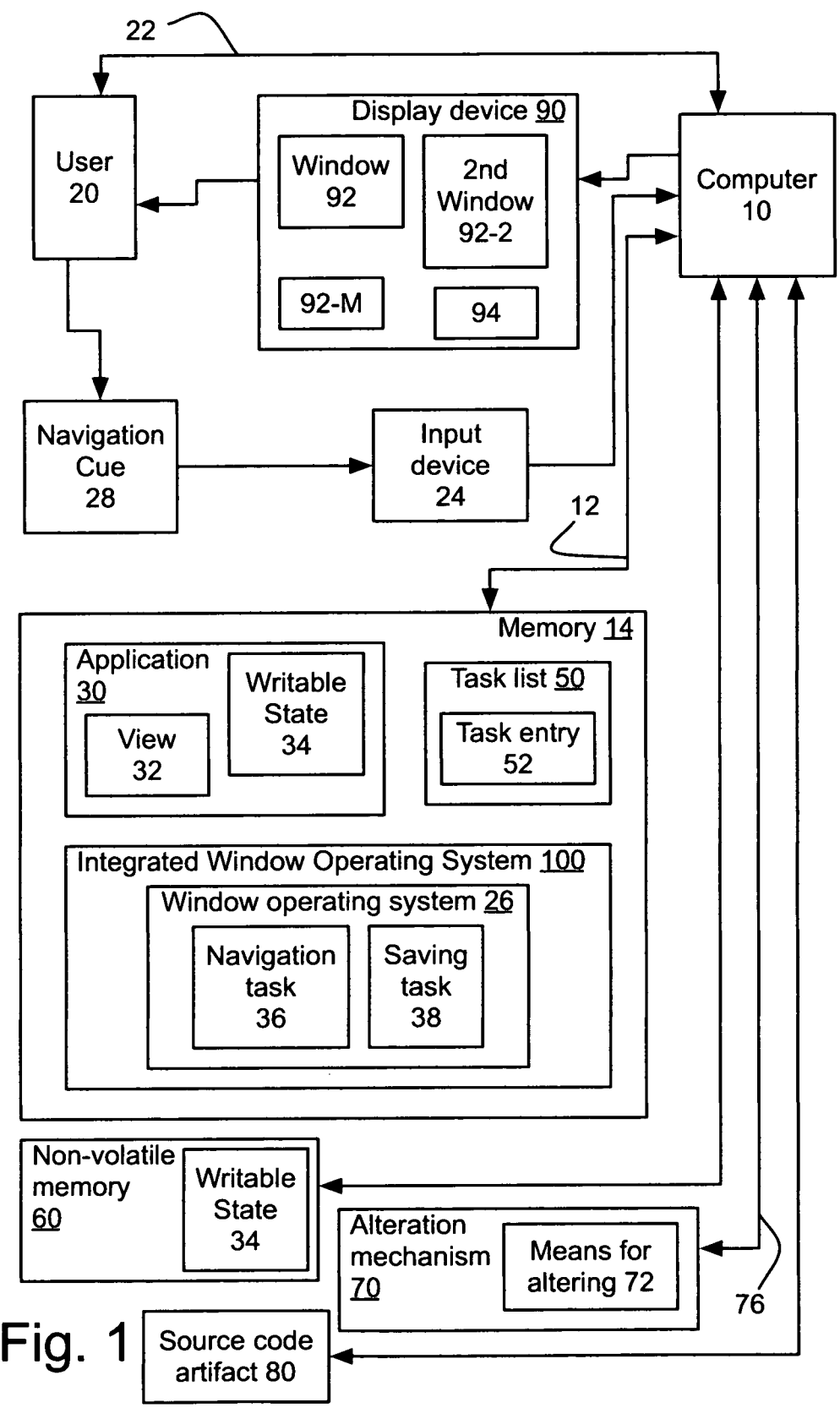
FIGS. 1 to 3 shows an example of certain elements of the invention.

The invention includes a computerized method responding to a navigation cue 28 from a user 20, as shown in FIG. 1. The window operating system 26 directs at least one computer 10 to respond to said navigation cue within an application 30. The writable state 34 of the application is saved using the window operating system directing the computer to perform the saving task 38, by writing the writable state to a non-volatile memory 60, encapsulating enough of the state of said application so that at least one view 32 open at the time of writing may be reconstructed. And directing the computer through the window operating system to perform the navigation task 36 indicated by the navigation cue.

The user 20 interacts 22 with the computer 10 by providing a navigation cue 28 to an interactive user input device 24, and perceiving at least one window 92 through a display device 90 driven by the computer. While there are situations in which the display device also acts as an input device, this will not be discussed further here in order to simplify the discussion. However, this is not being done to limit the scope of the claims, where such display devices will be considered to include an input device. The included input device may be implemented as buttons, a touch or pressure sensitive membrane, or a charge sensitive array able to surmise the location of a body part of the user, such as a finger or hand, or a pen.

As used herein, an integrated window operating system 100 is a window operating system 26 where every navigation task 36 is performed with the saving task 38 saving the writable state 34 of the application 30 to the non-volatile memory 60, when the user 20 presents the navigation cue 28 through the input device 24 to the computer 10.

The invention minimizes the damage and loss from computer and application crashes, as well as the frustration caused by inadvertent loss of data. The window operating systems that benefit from the invention include those sold by Microsoft, Apple, and Red Hat. All personal computers and workstations benefit from implementations of their window operating system where navigation cues trigger saving the writeable state of the applications running on those systems as well as the navigation task to be done.

While there have been numerous examples of task cues which also triggered navigation, the inventor knows of no window operating system where triggering a navigation cue saves the writable state of an application.

The invention includes the following, which will each be discussed in turn. An alteration mechanism 70 including a means for altering 72 a window operating system 26 by altering the hook triggered by each navigation cue 28 to integrate saving the writable state 34 of the application 30. The window operating system 26 integrating response to each navigation cue and saving the writable state 34, which will be referred herein as an integrated window operating system 100. And at least one source code artifact 80, implemented as a manufacturing product, which can be installed on a computer 10 to implement navigation cues triggering saving the writable state. A business method including sales or subscriptions for implementations of the previous embodiments of the invention generating revenue for a business entity.

Responding to the navigation cue 28 further includes inserting at least one task entry 52 into the task list 50 maintained by the window operating system 26 to perform saving said writable state 34 of said application 30 using said window operating system directing said computer 10 and directing said computer through the window operating system to perform said navigation task 36 indicated by said navigation cue.

Figure 2A:
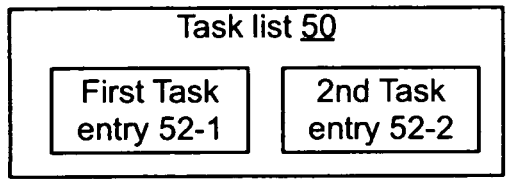

Responding to the navigation cue 28 of FIG. 1 may further include inserting a first task entry 52-1 into said task list 50 to perform the saving task 38 of said writable state 34 of said application 30 using said window operating system 26 directing said computer 10, and inserting a second task entry 52-2 into said task list directing said computer through the window operating system to perform said navigation task 36 indicated by said navigation cue, as shown in FIG. 2A.

The task list 50 is shown in FIG. 1 as separate from the window operating system 26 to clarify the operation of the invention. From most technical points of view, it is usually considered part of it.

The writable state 34 as saved on the non-volatile memory 60, is a product of this process of the invention.

The invention includes alteration mechanism 70 including a means for altering 72 a window operating system 26 by altering the hook triggered by each navigation cue 28 to integrate saving the writable state 34 of the application 30.

Figure 2B:
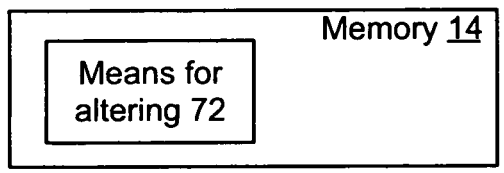
Figure 2C:
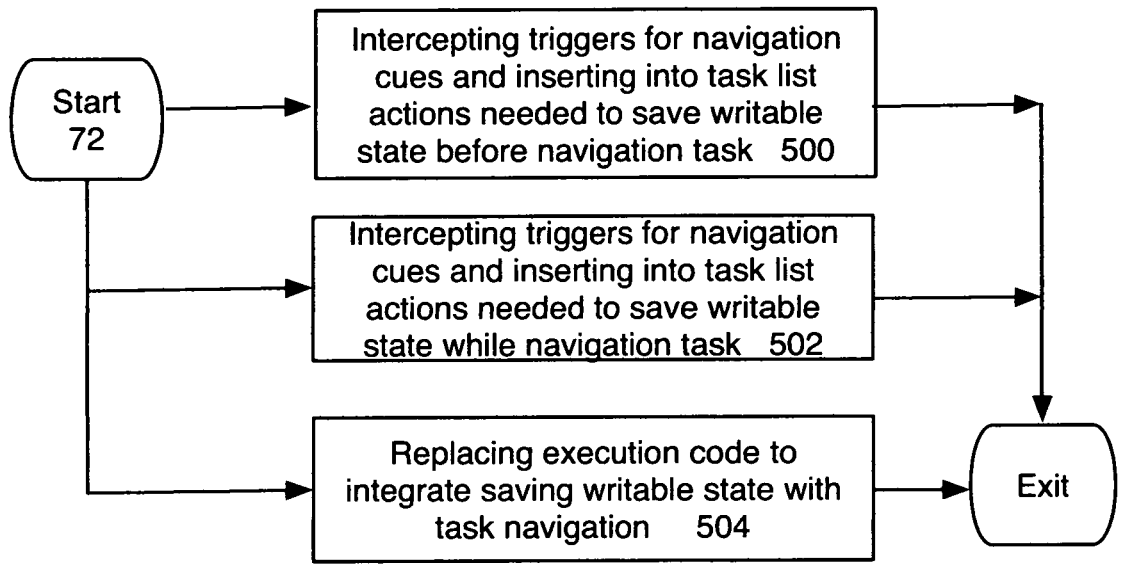

The means for altering may be implemented and/or loaded into the accessibly coupled 12 memory 14, as shown in FIG. 2B. The means for altering may viewed as a program system residing in the accessibly coupled 12 memory 14 and include any of the following operations as shown in FIG. 2C. Operation 500 supports intercepting triggers for the navigation cue 28 and inserting into the task list 50 the actions needed to save the writable state 34 of the application 30 prior to the navigation cue is being executed. Alternatively, operation 502 supports intercepting triggers for the navigation cue and inserting into the task list of the actions needed to save the writable state of the application while the navigation cue is being executed. Another alternative, operation 504 supports replacing the execution code responding to the navigation cue execution code to integrate saving the writable state and performing the commanded navigation task 36.

Figure 2D:
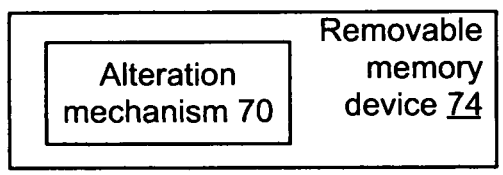
Figure 2E:
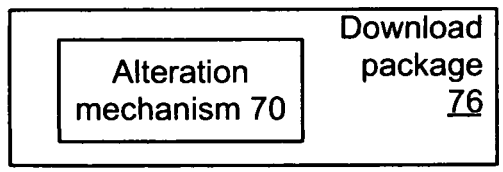

A removable memory device 74 may include the alteration mechanism 70, which can be removably-accessibly 76 coupled to the computer 10 to alter the window operating system 26, as shown in FIGS. 1 and 2D. Alternatively, a download package 78 may include the alteration mechanism, which the computer may receive through a download operation, and execute to alter the window operating system, either with or without the user's direct knowledge or approval, as shown in FIG. 2E.

The resulting window operating system, referred to herein as the integrated window operating system 100 integrates response to navigation triggers with saving the writable state of applications. Window operating systems in the future may be distributed with this feature, and companies and/or individuals may generate revenue based in part on the inclusion of the invention in the window operating system being distributed, either as a standalone computer product, a distribution memory device, or as a download.

The invention also includes a source code artifact 80, implemented as a manufacturing product, which can be installed on the computer 10 to implement the navigation cue 28 triggering saving the writable state 34. These artifacts can be accessed to alter and/or build a window operating system 26, for that or another computer. The artifacts may be included on a removable memory device 74, or be included in a download package 76. Installation may include decompressing at least part of the artifact, building a directory structure populated at in least part by the decompressed contents of the artifact, and the results of compilation, assembling, and/or linking operations using the contents of the artifact.

Figure 3:
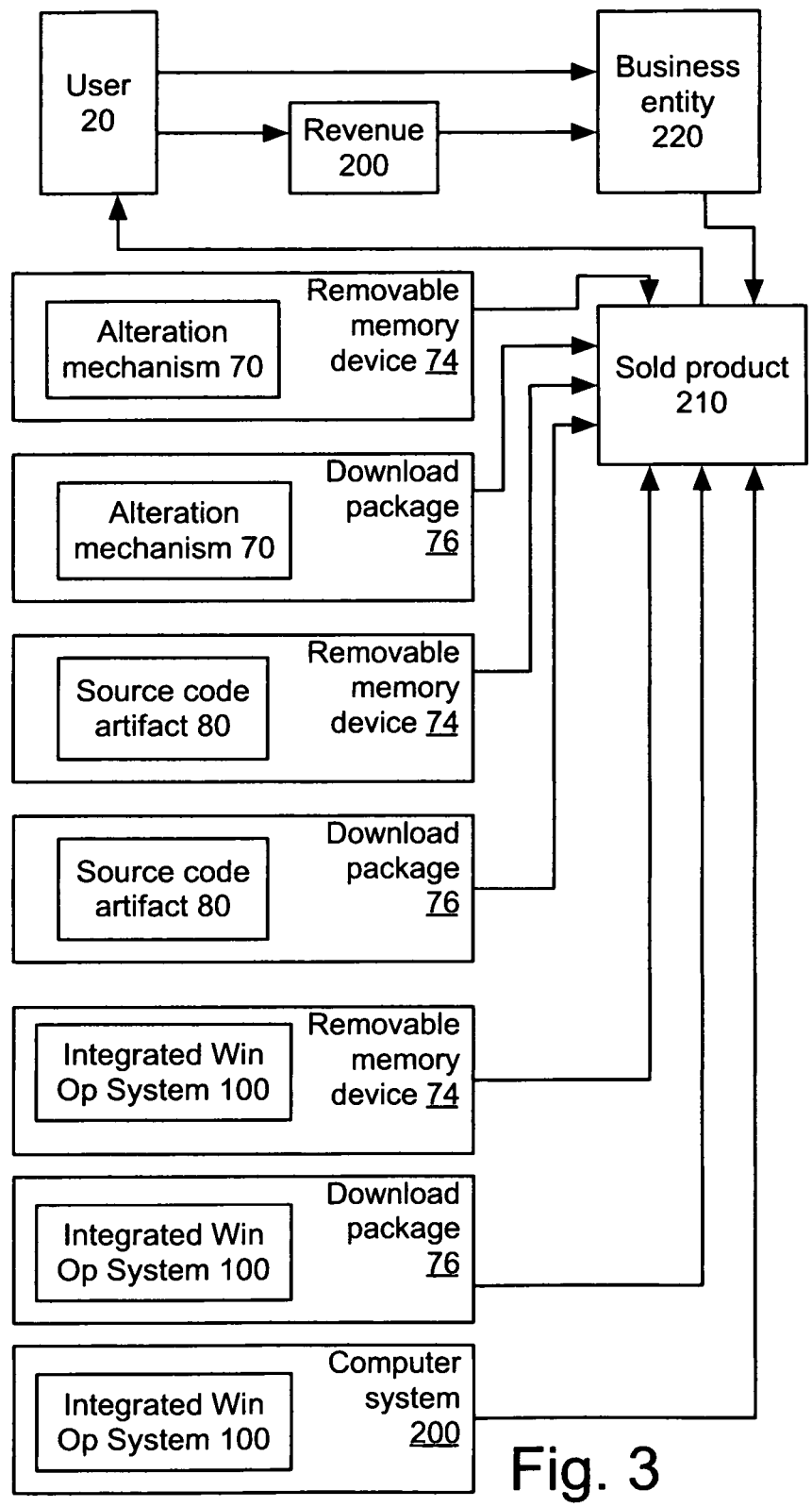

The invention includes a business method including sales or subscriptions for implementations of the previous embodiments of the invention which generates a revenue 200 for a business entity 220, as shown in FIG. 3. An example of the implementation may include a download package 76 sold for a price by the business entity to create the revenue. Another example, a computer system 200 with an integrated window operating system 100, sold or leased by the business entity to create the revenue. Another example, a distribution device, such as a removable memory device 74 incorporating the alteration mechanism 70 and/or the integrated window operating system 100 and/or the source code artifact 80 sold by the business entity to the user 20 to create the revenue. Any of the sales may be part of a subscription creating the revenue for the business entity. The implementation and the revenue are products of the business process.

The sold product 210 and the revenue 200 are products of the business process.

Computer science has matured through a series of "user-friendliness" levels, which is the term used to refer to how easeful and expected the behavior of the computer programs are in response to user cues. For instance, the print function in computer programs at one time required several parameters representing explicitly defined decisions by the user to successfully send any output to a printer. Now, in standard office processing software, it is typical to find a "print" button in the toolbar that enables a user to simply indicate print without requiring any additional input parameters or decisions by the user. This is a vast improvement in "user-friendliness" around this function.

The "save" function requires too much user input for optimal "user-friendliness." Computer hardware has functioned with two types of memory (RAM, or temporary memory, and ROM, or permanent memory) on all computer models that have generated market share. Computer scientists have been pre-disposed to require the user to actively indicate that temporary memory must be explicitly save to permanent memory. This decision point would not be required if the following clarifications in thinking and programming were implemented, thereby increasing the "user-friendliness" of computer usage across the board.

By modeling an older technology, paper, it becomes clear that it would be a more intuitive response for users, if computers retained information in permanent memory unless explicitly erased. To accomplish this, the clear distinction between a navigation cue and a task cue is necessary. A task cue typically involves saving the temporary memory to permanent memory and can involve a subsequent navigation. A navigation cue involves only a navigation.

By creating a third option, a "navigation activator", where each navigation first saves the temporary memory on the current view to permanent memory, and then performs the desired navigation, the computer responds as the user familiar with paper would presume that it should. The computer will save the information on a page (view), unless explicitly told to erase, rather than behaving as it currently does, which is that the computer will erase the information on a page (view) unless explicitly told to save. This allows a person to leave a page on which new data has been entered without "saving" it, and to return to the same page later and see the new data displayed.

There are three inherently valuable benefits to navigation activated saves: First, the user need not click a "save" button anymore, thus eliminating a step in data management. Second, it potentially reduces server load dramatically when the design of new data entry/selection is optimized via a list of task options (choices) on a single page. Third, in the environment of e-commerce, and similar environments where multiple options may be entered/chosen on a page view, there is the added benefit of saving "context" for the user because a change of view in order to make selections is no longer required. Especially for new users, "saving context," or retaining the familiar, original view has a psychological benefit that enhances a user's comfort level and adaptation to using the internet.

As used herein, a computer will include at least one finite state machine, inference engine, neural network, and/or instruction processor directing at least one data processor. When relevant, each of the data processors will be directed by at least one instruction processor.

The invention adds value to data management and processing systems including, but not limited to, operating systems, web browsers, and other application tools.

The operating systems preferably support at least one user interface, such as linux, windows, Unix, and Mac OS X. In such operating systems, the control panel for user/system preferences and/or configuration controls may be optimized to save the settings when another window/application is opened. Also, any or all of the following events may also preferably trigger saving the writable state of an application: Navigation out of the application, Navigation to another application, Navigation closing the application, and/or Navigation minimizing the interface to the application. In such situations, triggering one of these navigation cues would cause the operating system to trigger saving the writable state, which may include, but is not limited to, saving at least one writable page, file, document, and/or package that have been modified.

As used herein, saving the writable item (one or more pages, files, documents, and/or packages) may include posting the item to a cache with a save-to-permanent memory flag, alternatively, forcing the cache to flush the writable item to a permanent memory, or directly saving the writable item to the permanent memory.

The invention enhances value and usability of a web browser. With this invention, a browser would cause information on a first page view to be retained when the user changes to a new url or sends new parameters to the current url to effect a different view. The entered information would be retained so that if the user returned to the first page, the new information they entered before the navigation off the page would be displayed. This may be especially valuable to e-commerce vendors who do not want their shoppers to lose what they have entered in a shopping cart because they left their cart page to check out prices on a competing site. Examples of browsers include, but are not limited to, internet explorer, firefox, opera, netscape, safari, and mozilla.

There are applications where the saving of user time and/or server load and/or context may increase profits by potentially millions of dollars. Two particular groups of individual users, authors of software applications, industrial or corporate vendors and business developers may particularly benefit. Almost everyone doing these sorts of work has reported losing hours of effort because they forgot to save what they did. This could become a nightmare of the past.

Similarly, where a web page designer or webmaster must often update multiple html pages with new data or customer information, etc., they must now save the new data before beginning work on the next updatable page. With the invention they may go directly from one updated page to the next updatable page without having to separately save their work. Examples of tools where this would be useful include various composition tools, such as Netscape Composer, as well as various html, java, XML, and other web development tools and toolkits.

Similarly, where an application developer, programmer and/or software engineer is debugging and/or developing an application, multiple files may be involved in the work. Often long hours are spent focused on finding a bug. Causing the files to be saved when the application developer opens another window, such as email, has the advantage of saving the work in progress at the moment of distraction. This is a form of insurance, which the often tired, applications developer may need. Examples of program development systems include XCode for developing applications targeting the Mac OS X operating system environment.

There are a number of other software applications, which can similarly benefit from the invention. Word processing tools like the What You See Is What You Get (WYSIWYG) tools such as Word, wordperfect, PageMaker and/or Scientific Workplace. Typesetting tools such as latex. And Font development tools. The following are further examples involving email, forms and messaging tools. Email programs include, but are not limited to Outlook, and/or Eudora. Lotus notes includes form development for interoffice communications. Instant messaging and/or profile management. Adobe acrobat form development toolkits.

Other examples include spreadsheets such as excel, and Quattro pro. Other examples include presentation, graphics, and media development tools. Presentation development tools include, but are not limited to, Powerpoint. Graphics development tools include, but are not limited to, photoshop, illustrator, painter, and/or acrobat. Multi-media development tools include, but are not limited to, imovie, iphoto, garbage band, and/or itunes. Client server interfaces running on one or more computer include, but are not limited to, MathType, and/or invoicing tools like timesheet.

Other applications benefiting from the invention include, but are not limited to the following:
  Accounting software such as quicken, quickbooks, tax preparation tools
  Trade and/or data evaluation tools such as stock, commodity and bond trading tools
  Simulation and modeling tools such as matlab, mathematica, Maple, and/or simulink
  Games and game development tools for video, role playing, and/or distributed user environments
  Educational software such as google, yahoo, library viewers, and/or training tools
  e-commerce such as Amazon, ebay, Schwab, Lands End, and so on
  logistics planning and management such as flight scheduling, hotels, cars, for example: expedia.com
  catering management systems such as Online grocery stores, will call pickup, and/or restaurant/catering interfaces The preceding embodiments provide examples of the invention and are not meant to constrain the scope of the following claims.

What is claimed is:

1. A method, comprising the step of:
responding to a navigation cue within an application by a window operating system directing at least one computer, further comprising the step of:
  operating a hook triggered by said navigation cue that integrates saving just a writable state of said application, while the navigation cue is being executed, comprising
  invocation of a trigger to said navigation cue to insert at least one task entry into a task list maintained by the window operating system;
  executing the task entry and thereby saving just said writable state of said application,
  using said window operating system directing said computer in order to survive a crash of said computer wherein said computer when executing said application that could lead said application into an illegal state that is not detectable by said computer and said window operating system,
  wherein writing said just said writable state of said application to a non-volatile memory involves encapsulating enough of the state of said application that at least one view open at the time of writing may be reconstructed after said crash of said computer; and
  directing said computer through the window operating system to perform the navigation task indicated by said navigation cue.

2. The method of claim 1, wherein the step inserting, further comprises the steps:
  inserting a first of said task entries into said task list to perform a saving task of said just said writable state of said application using said window operating system directing said computer; and
  inserting a second of said task entries into said task list directing said computer through the window operating system to perform said navigation task indicated by said navigation cue.

3. A method of claim 1, further comprising said writable state saved to said non-volatile memory.

4. A method of claim 1, further comprising the step of:
altering a second window operating system by said computer to create said window operating system comprising the step:
  altering the hook of said second window operating system to create said hook of said window operating system triggered by said navigation cue to integrate saving said just said writable state of said application, for each of a plurality of navigation cues.

5. The method of claim 4, wherein the step altering said hook, further comprises the steps: intercepting a trigger to said navigation cue to insert at least one task entry into the task list maintained by the second window operating system to perform saving said just said writable state of said application using said window operating system directing said computer and directing said computer through the window operating system to perform said navigation task indicated by said navigation cue.

6. An alteration mechanism comprising:

means for altering a second window operating system to create a window operating system, comprising:

means for altering a hook of said second window operating system to create said hook of said window operating system triggered by a navigation cue to integrate saving just a writable state of an application, for each of a plurality of said navigation cues by performing the steps of:

responding to said navigation cue within said application by said window operating system, further comprising the step of:

operating said hook triggered by said navigation cue that integrates saving just said writable state of said application, while the navigation cue is being executed, comprising invocation of a trigger to said navigation cue to insert at least one task entry into a task list maintained by said window operating system;

executing the task entry and thereby saving just said writable state of said application, using said window operating system directing said computer in order to survive a crash of said computer wherein said computer when executing said application that could lead said application into an illegal state that is not detectable by said computer and said window operating system, wherein writing said just said writable state of said application to a non-volatile memory involves encapsulating enough of the state of said application that at least one view open at the time of writing may be reconstructed after said crash of said computer; and directing said computer through the window operating system to perform the navigation task indicated by said navigation cue.

7. The alteration mechanism of claim 6, is stored on a removable memory device by a computer.

8. The alteration mechanism of claim 6, retrieved from a download package accessed by a computer.

9. A non-transitory memory device configured to be accessed by said computer and/or a removable memory device configured for installation and access by said computer, each including a source code artifact that when executed implements the performance of a method comprising:

responding to a navigation cue within an application by a window operating system directing said computer, further comprising the step of:

operating a hook triggered by said navigation cue that integrates saving just the writable state of said application, while the navigation cue is being executed, comprising invocation of a trigger to said navigation cue to insert at least one task entry into a task list maintained by said window operating system;

executing the task entry and thereby saving just said writable state of said application, using said window operating system directing said computer in order to survive a crash of said computer wherein said computer when executing said application that could lead said application into an illegal state that is not detectable by said computer and said window operating system, wherein writing said just said writable state of said application to a non-volatile memory involves encapsulating enough of the state of said application that at least one view open at the time of writing may be reconstructed after said crash of said computer; and directing said computer through said window operating system to perform said navigation task indicated by said navigation cue.

10. The method of claim 4 further comprising at least one of the steps of downloading a source code artifact by said computer to reside in memory; wherein said source code artifact implements at least part of at least one of the steps of responding to said navigation cue and/or altering said window operating system to respond to said navigation cue;

accessing a source code artifact from a removable memory device by said computer;

using a source code artifact by said computer to alter and/or to build said window operating system for said computer and/or for another of said computers; and using a source code artifact by said computer to alter a second window operating system to create and/or to build said window operating system.

11. The method of claim 10, further comprises at least one of the steps of installing said source code artifact on said computer;

decompressing at least part of said source code artifact to create a decompressed content;

building a directory structure populated at least in part by said decompressed content;

compiling based upon the contents of said source code artifact to create a compiled result;

assembling based upon at least one of said contents of said source code artifact and said compiled result to create an assembled result;

compiling based upon at least one of said contents of said source code artifact, said compiled result, and said assembler result to create a linked result; and using at least one of said directory structure, said decompressed content, said compiled result, said assembled result, and said link result to alter and/or build at least one of said window operating system.

12. The method of claim 10, further comprising the step of delivering by an entity an item, with said item including at least one of:

said source code artifact;

an alteration mechanism implementing said step of responding to said navigation cue for said window operating system;

said window operating system implementing said navigation cues triggering saving said writeable state of said application and performing said navigation task indicated by said navigation cue;

altering said second said window operating systems to create and/or build said window operating system implementing said navigation cues triggering saving said writeable state of said application and performing said navigation task indicated by said navigation cue; and a download package including at least one of said source code artifact, said alteration mechanism, said window operating system and/or altering said second of said window operating system.

13. The method of claim 12, wherein the step delivering by said entity said item further comprises the step of: delivering said item to create said item residing in memory for said access by said computer.

14. The method of claim 13, wherein the step of delivery by said entity said item to create said item including delivering a computer system implementing said navigation cues triggering saving said just said writeable state of said application and performing said navigation task indicated by said navigation cue.

15. A computer system configured to operate a computer directed by a window operating system responding to a navigation cue within an application by saving said just a writable state of said application in order to survive a crash of said computer when executing said application that could otherwise lead said application into an illegal state that is not detectable by said computer and said window operating system;

said computer system further configured to operate a hook triggered by said navigation cue that integrates saving just said writable state of said application, while the navigation cue is being executed, comprising invocation of a trigger to said navigation cue to insert at least one task entry into a task list maintained by the window operating system;

execution of said task entry and thereby saving just said writable state of said application.

16. The computer system of claim 15, comprising said computer, and said window operating system.

17. The computer system of claim 16, further comprising at least one display device configured to present said application using said window operating system to direct said computer.

* * * * *